(12) United States Patent
Wi

(10) Patent No.: US 8,061,504 B2
(45) Date of Patent: Nov. 22, 2011

(54) APPARATUS FOR EXTRACTING PARTS FROM GENERAL-PURPOSE STORAGE FOR VEHICLE

(75) Inventor: Kyung Chan Wi, Ulsan (KR)

(73) Assignee: Hyundai Motor Company, Seoul (KR)

( * ) Notice: Subject to any disclaimer, the term of this patent is extended or adjusted under 35 U.S.C. 154(b) by 249 days.

(21) Appl. No.: 12/364,198

(22) Filed: Feb. 2, 2009

(65) Prior Publication Data
US 2010/0012466 A1    Jan. 21, 2010

(30) Foreign Application Priority Data
Jul. 18, 2008  (KR) .................. 10-2008-0069936

(51) Int. Cl.
*B65G 47/30* (2006.01)
(52) U.S. Cl. .............. 198/418.6; 198/347.1; 198/463.3; 198/531; 198/532; 221/301; 414/268
(58) Field of Classification Search .............. 198/418.1, 198/418.6, 431, 432, 463.3, 463.4, 531, 532, 198/540–549, 347.1; 221/290, 294, 297, 221/299, 301; 414/268, 793.5, 793.6
See application file for complete search history.

(56) References Cited

U.S. PATENT DOCUMENTS

| | | | | |
|---|---|---|---|---|
| 730,920 | A * | 6/1903 | Joecken | 144/245.5 |
| 2,558,633 | A * | 6/1951 | Tuttle | 198/463.6 |
| 2,731,131 | A * | 1/1956 | Shannon | 414/796.1 |
| 2,813,615 | A * | 11/1957 | Klein | 198/433 |
| 3,537,567 | A * | 11/1970 | Nowicki | 198/399 |
| 3,628,649 | A * | 12/1971 | Arvisenet | 198/444 |
| 3,974,922 | A * | 8/1976 | Selusnik et al. | 414/796.8 |
| 4,010,841 | A * | 3/1977 | Bonzack | 198/357 |
| 4,094,236 | A * | 6/1978 | Holmes et al. | 99/450.4 |
| 4,274,529 | A * | 6/1981 | Mori et al. | 198/463.3 |
| 4,821,865 | A * | 4/1989 | Hirata et al. | 198/368 |
| 4,821,919 | A * | 4/1989 | Smith | 221/131 |
| 4,942,822 | A * | 7/1990 | Cotic | 104/16 |
| 4,946,340 | A * | 8/1990 | Murphy et al. | 414/788.8 |
| 4,965,981 | A * | 10/1990 | Kikuchi | 53/142 |
| 5,000,393 | A * | 3/1991 | Madsen | 242/560 |
| 6,454,076 | B1 * | 9/2002 | Dotson et al. | 193/2 R |
| 6,484,867 | B2 * | 11/2002 | Spatafora et al. | 198/418.1 |
| 6,971,646 | B2 * | 12/2005 | Schmid | 271/192 |
| 7,156,607 | B2 * | 1/2007 | Anderson et al. | 414/790 |
| 7,650,985 | B2 * | 1/2010 | Day | 198/532 |
| 7,677,543 | B2 * | 3/2010 | Gulbrandsen et al. | 270/52.22 |
| 7,748,519 | B2 * | 7/2010 | Freudelsperger | 198/550.01 |
| 7,775,756 | B2 * | 8/2010 | Koike et al. | 414/331.11 |

FOREIGN PATENT DOCUMENTS

| | | |
|---|---|---|
| JP | 05-238557 | 9/1993 |
| JP | 07-052847 | 2/1995 |
| JP | 10-297763 | 11/1998 |
| KR | 10-0645507 | 11/2006 |

* cited by examiner

*Primary Examiner* — Joseph A Dillon, Jr.
(74) *Attorney, Agent, or Firm* — Edwards Wildman Palmer LLP; Peter F. Corless

(57) ABSTRACT

The present invention provides an apparatus for extracting parts from a general-purpose storage for various vehicle models, the apparatus including a synchronization bar and a driving bar, which transfer driving force by a pneumatic cylinder for providing power of linear reciprocating movement, and an automatic part dropping unit that drops the parts placed on a plurality of plates rotated by the rotation of a plurality of shafts configured to be rotated by the transferred driving force.

14 Claims, 8 Drawing Sheets

APPARATUS FOR EXTRACTING PARTS FROM GENERAL-PURPOSE STORAGE FOR VEHICLE

CROSS-REFERENCE TO RELATED APPLICATION

This application claims under 35 U.S.C. §119(a) the benefit of Korean Patent Application No. 10-2008-0069936 filed Jul. 18, 2008, the entire contents of which are incorporated herein by reference.

BACKGROUND (a) Technical Field

The present invention relates to an apparatus for extracting parts from general-purpose storage for various vehicle models. More particularly, the present invention relates to an unmanned automatic feeding apparatus which sequentially drops parts from a pallet preferably rotated by a plate that is rotated by a pneumatic cylinder and feeds the parts into a production line.

(b) Background Art

Unmanned automation is used in most production and assembly lines of vehicle manufacturing factories, however some processes require that a worker directly performs a few operations instead of automation.

In the case of a conventional apparatus for extracting parts from a general-purpose storage for various vehicle models, a worker standing by the production line at all times extracts the loaded parts from the pallet one by one and loads the parts on the production line. Accordingly, since the above process is a semi-automatic process, when the worker presses a "Done" button after loading the parts on the production line, the production line is suitably operated and the production operations are conducted.

Accordingly, in the case where the parts are extracted from the conventional storage for various vehicle models, since the worker who unloads the loaded parts is necessarily required, the working process is not performed automatically, and further the worker should confirm whether the operation for loading the parts is completed.

To this end, an unmanned automatic feeding apparatus, which automatically extracts working parts for a desired vehicle model sequentially from a pallet without a worker and feeds the working parts to the production line, is required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus for suitably extracting parts from a general-purpose storage for various vehicle models, the apparatus preferably including an automatic part dropping unit, which sequentially drops parts loaded on plates suitably rotated with respect to forward and backward movements of driving means such as a pneumatic cylinder, and a receiving unit and a transfer unit, which receive the dropped parts and suitably feed the same to a process, such that the working parts corresponding to various vehicle models are automatically fed to the next process.

In one embodiment, the present invention provides an apparatus for extracting parts from a general-purpose storage for various vehicle models, the apparatus preferably comprising: at least one automatic part dropping unit preferably including a pneumatic cylinder; a receiving unit preferably including a plurality of loading jigs; and a transfer unit for feeding the parts to a process, wherein the automatic part dropping unit preferably includes a plurality of plates suitably supporting the loaded parts and a plurality of shafts suitably rotated by the operation of the pneumatic cylinder such that the plurality of plates connected alternately to the shafts at a predetermined angle are reciprocated and rotated by the operation of the pneumatic cylinder to suitably extract the part located at the lowest position among the loaded parts.

In another preferred embodiment, the automatic part dropping unit preferably comprises: a base on which the pneumatic cylinder is provided; a synchronization bar having two ends suitably moved in connection with forward and backward movements of the pneumatic cylinder; a pair of driving bars connected to the two ends of the synchronization bar and suitably rotated together therewith; a pair of first transfer levers and a pair of second transfer levers, suitably rotatably connected to the pair of driving bars, respectively; a pair of first shafts suitably rotatably connected by the pair of first transfer levers; a pair of second shafts suitably rotatably connected by the pair of second transfer levers; and a frame for assisting the rotation of the first and second shafts and fixed to the base, wherein the first shafts and the second shafts preferably include a plurality of plates alternately connected thereto at a predetermined angle, and the part at the lowest position loaded on the automatic part dropping unit is extracted when the plates connected to the first shafts and the second shafts are rotated by the forward and backward movements of the pneumatic cylinder.

In another preferred embodiment, the automatic part dropping unit preferably comprises: a base on which the pneumatic cylinder is provided; a synchronization bar having two ends moved in connection with forward and backward movements of the pneumatic cylinder; a pair of driving bars suitably connected to the two ends of the synchronization bar and suitably rotated together therewith; a pair of first transfer levers and a pair of second transfer levers, suitably rotatably connected to the pair of driving bars, respectively; a pair of first shafts suitably rotatably connected by the pair of first transfer levers; a pair of second shafts suitably rotated by the pair of second transfer levers and preferably connected to a pair of pinions A; a pair of third shafts preferably connected to a pair of pinions B moved in connection with the pair of pinions A and suitably rotated together therewith; and a frame for assisting the rotation of the first to third shafts and fixed to the base, wherein the first shafts and the third shafts preferably include a plurality of plates alternately connected thereto at a suitably predetermined angle, and the part at the lowest position loaded on the automatic part dropping unit is extracted when the plates connected to the first shafts and the third shafts are suitably rotated by the forward and backward movements of the pneumatic cylinder.

In still another preferred embodiment, the automatic part dropping unit comprises at least one guide provided on the base in the vertical direction to assist the drop of the loaded parts.

In yet another preferred embodiment, the automatic part dropping unit comprises a suitable detection sensor for detecting the number of loaded parts.

In still yet another preferred embodiment, the receiving unit including the plurality of loading jigs preferably comprises an air cylinder, a power base, and an LM bush such that the receiving unit is moved up and down.

In a further preferred embodiment, the plurality of loading jigs of the receiving unit is configured to be rotated to correspond to various vehicle models, and the receiving unit comprises an index for controlling the rotation of the plurality of loading jigs.

In another further preferred embodiment, the transfer unit preferably comprises a servo motor, a rack, a pinion, and an LM guide.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
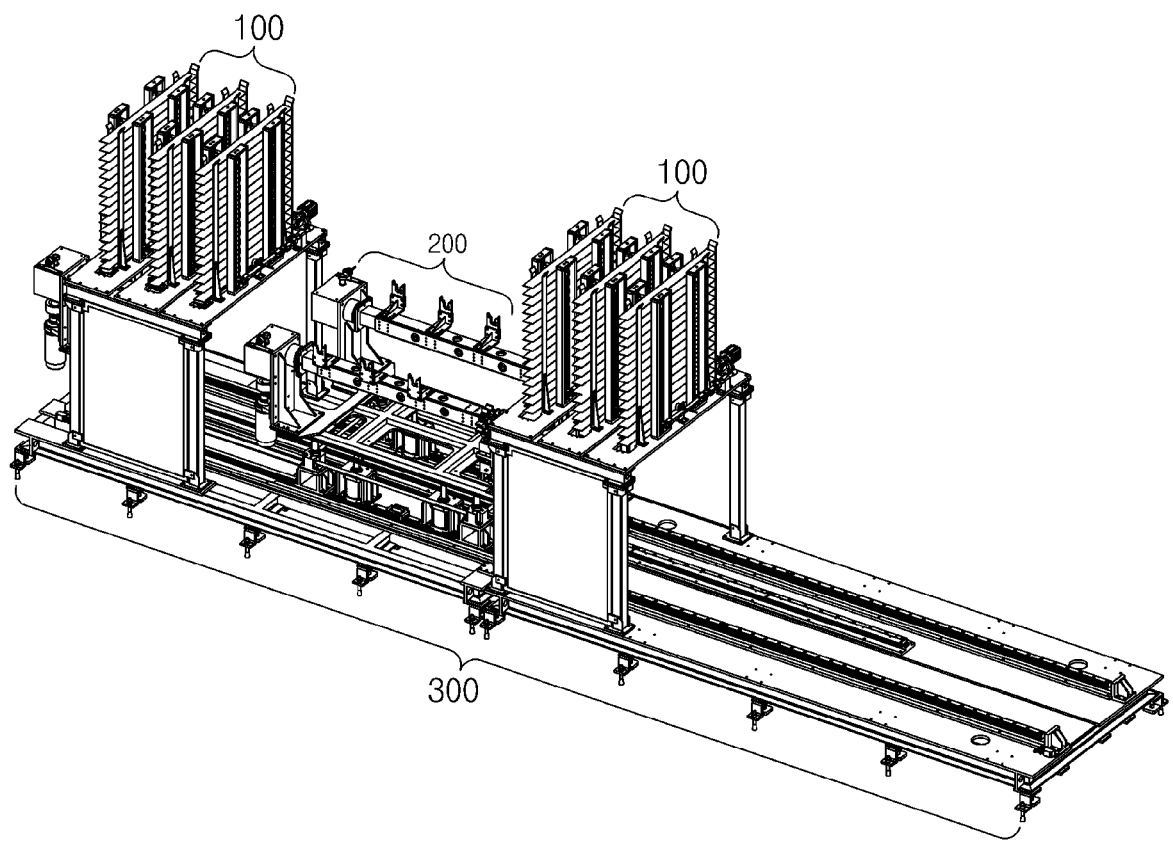
FIG. 1 is a perspective view of an apparatus for extracting parts from a general-purpose storage for various vehicle models in accordance with the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one aspect, the invention features an apparatus for extracting parts from a general-purpose storage for various vehicle models, the apparatus comprising at least one automatic part dropping unit, a receiving unit; and a transfer unit for feeding the parts to a process, wherein the automatic part dropping unit includes a plurality of plates supporting loaded parts and a plurality of shafts.

In one embodiment, the automatic part dropping unit includes a pneumatic cylinder.

In another embodiment, the receiving unit includes a plurality of loading jigs.

In another embodiment, the automatic part dropping unit including a plurality of plates and a plurality of shafts is rotated by the operation of a pneumatic cylinder such that the plurality of plates connected alternately to the shafts are reciprocated and rotated by the operation of the pneumatic cylinder to extract the part located at the lowest position among the loaded parts.

In another further embodiment, the plurality of plates connected alternately to the shafts are connected at a predetermined angle.

In still a further embodiment, the automatic part dropping unit comprises: a base on which a pneumatic cylinder is provided; a synchronization bar having two ends moved in connection with forward and backward movements of the pneumatic cylinder; a pair of driving bars connected to the two ends of the synchronization bar and rotated together therewith; a pair of first transfer levers and a pair of second transfer levers, rotatably connected to the pair of driving bars, respectively; a pair of first shafts rotatably connected by the pair of first transfer levers; a pair of second shafts rotatably connected by the pair of second transfer levers; and a frame for assisting the rotation of the first and second shafts and fixed to the base.

In a further related embodiment, the first shafts and the second shafts include a plurality of plates alternately connected thereto at a predetermined angle, and the part at the lowest position loaded on the automatic part dropping unit is extracted when the plates connected to the first shafts and the second shafts are rotated by the forward and backward movements of the pneumatic cylinder.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As described herein, in order to extract loaded parts for various vehicle models and feed the extracted parts to a production process corresponding to a desired vehicle model, the present invention preferably provides an apparatus for extracting parts from general-purpose storage for various vehicle models, in which corresponding parts placed on a plurality of plates are dropped by the rotational movement of the plurality of plates suitably configured to be rotated by a plate driving unit configured to linearly reciprocate, the dropped parts are suitably received in a receiving unit including a plurality of loading jigs, and the parts placed on the loading jigs are fed to a corresponding process through a transfer unit preferably configured to linearly reciprocate.

FIG. 1 is an exemplary perspective view of an apparatus for extracting parts from a general-purpose storage for various vehicle models in accordance with preferred embodiments of the present invention. As shown in FIG. 1, the exemplary apparatus for extracting parts from a general-purpose storage, in which various parts 10 (part-A to part-F) suitably corresponding to various vehicle models are loaded, the apparatus preferably comprising at least one automatic part dropping unit 100 preferably including a pneumatic cylinder 110 and a plurality of plates suitably rotated with respect to the pneumatic cylinder 100 so as to drop the parts 10 to be fed to a corresponding process in a receiving unit 200. Moreover, the apparatus of the present invention preferably comprises at least one receiving unit 200 including a loading jig 210 serving to receive the part dropped by the automatic dropping unit 100 and a transfer unit 300 for transferring the parts placed on the receiving unit 200 to a position to be fed to the corresponding process.

Figure 2:
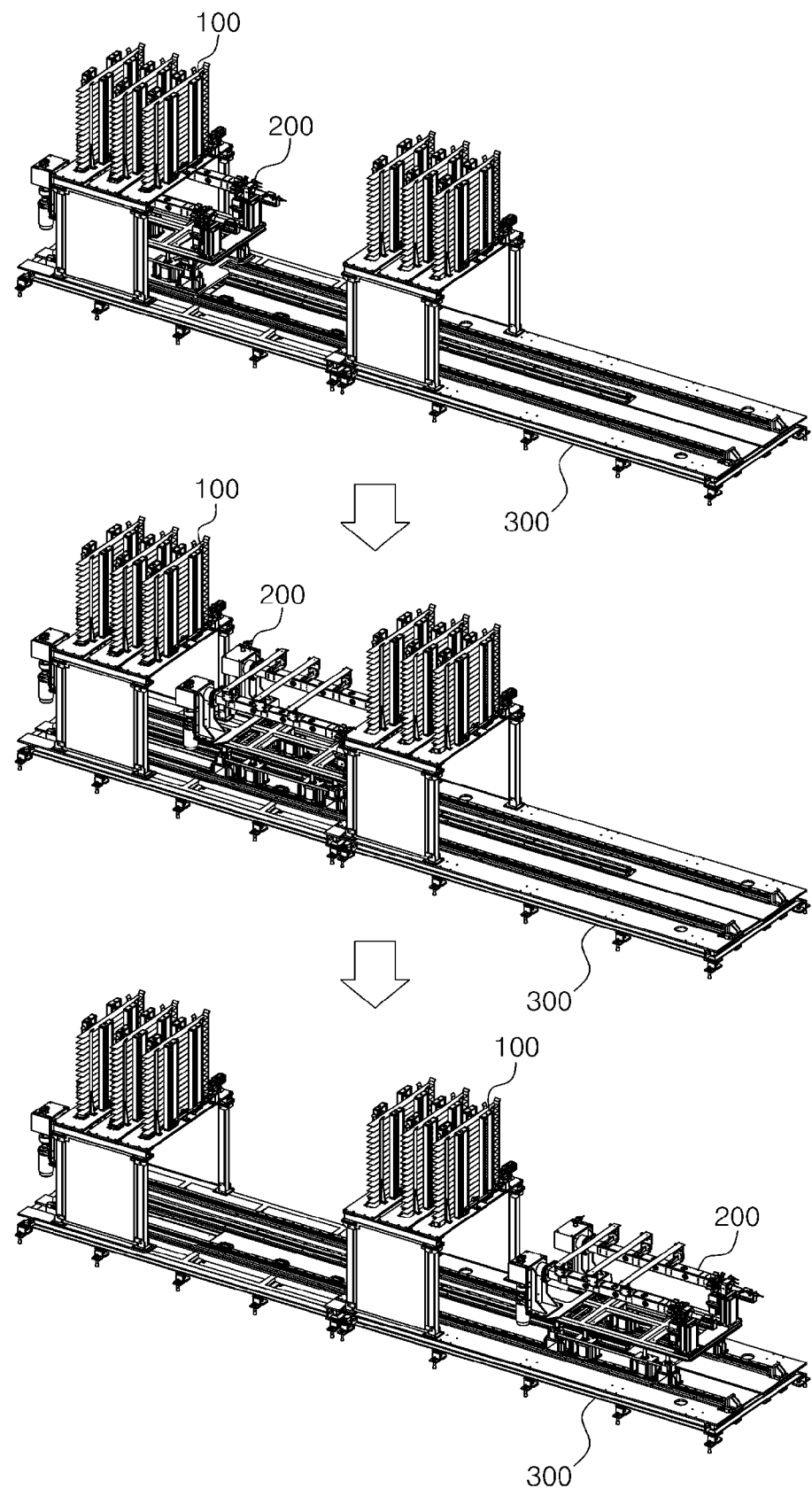
FIG. 2 is perspective views showing the operation sequence of the apparatus for extracting parts from a general-purpose storage for various vehicle models in accordance with the present invention.

FIG. 2 schematically shows the preferred operation sequence of the apparatus for extracting parts from a general-purpose storage for various vehicle models in accordance with preferred embodiments of the present invention.

As shown in FIG. 2, the part extracting apparatus, which preferably receives an extraction command for the part 10 of a corresponding vehicle model, suitably operates the pneumatic cylinder 100 in the automatic part dropping unit 100 so that the corresponding part is dropped in the receiving unit 200. Accordingly, in order to facilitate the dropping of the part from the automatic dropping unit 100, the receiving unit 200 preferably rises in the vertical direction to suitably support the part to be dropped at the rising position and then comes down. When the receiving unit 200 receiving the part completely or nearly completely comes down, the receiving unit 200 is preferably slid to an unloading position for feeding the part to the process by the operation of a rack 320 and a pinion (not shown) according to the operation of a servo motor of the transfer unit 300, and the part suitably transferred to the unloading position is picked up by a robot and fed to the next process.

Figure 3:
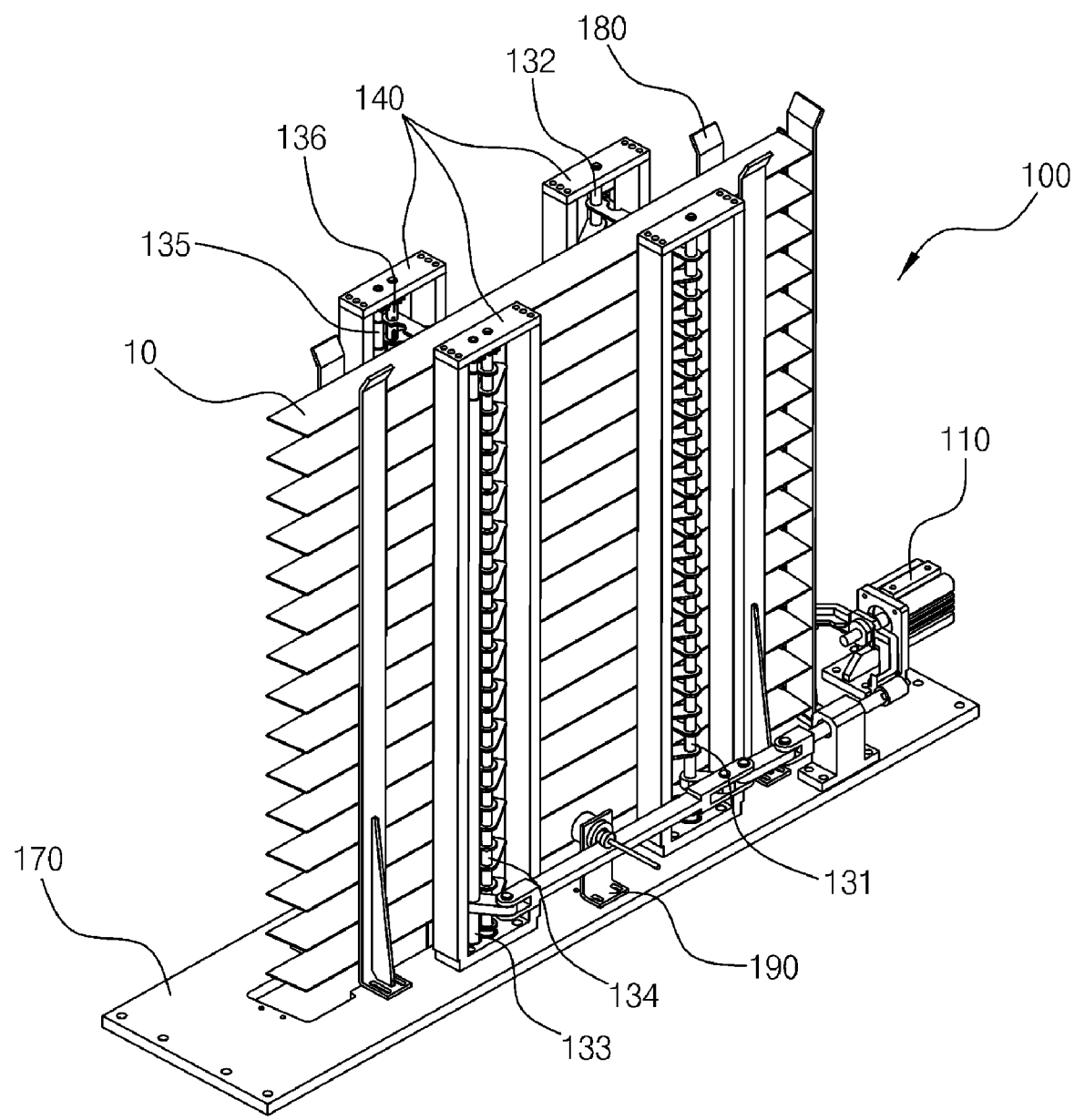
FIG. 3 is a perspective view showing an automatic part dropping unit in accordance with the present invention.
Figure 4:
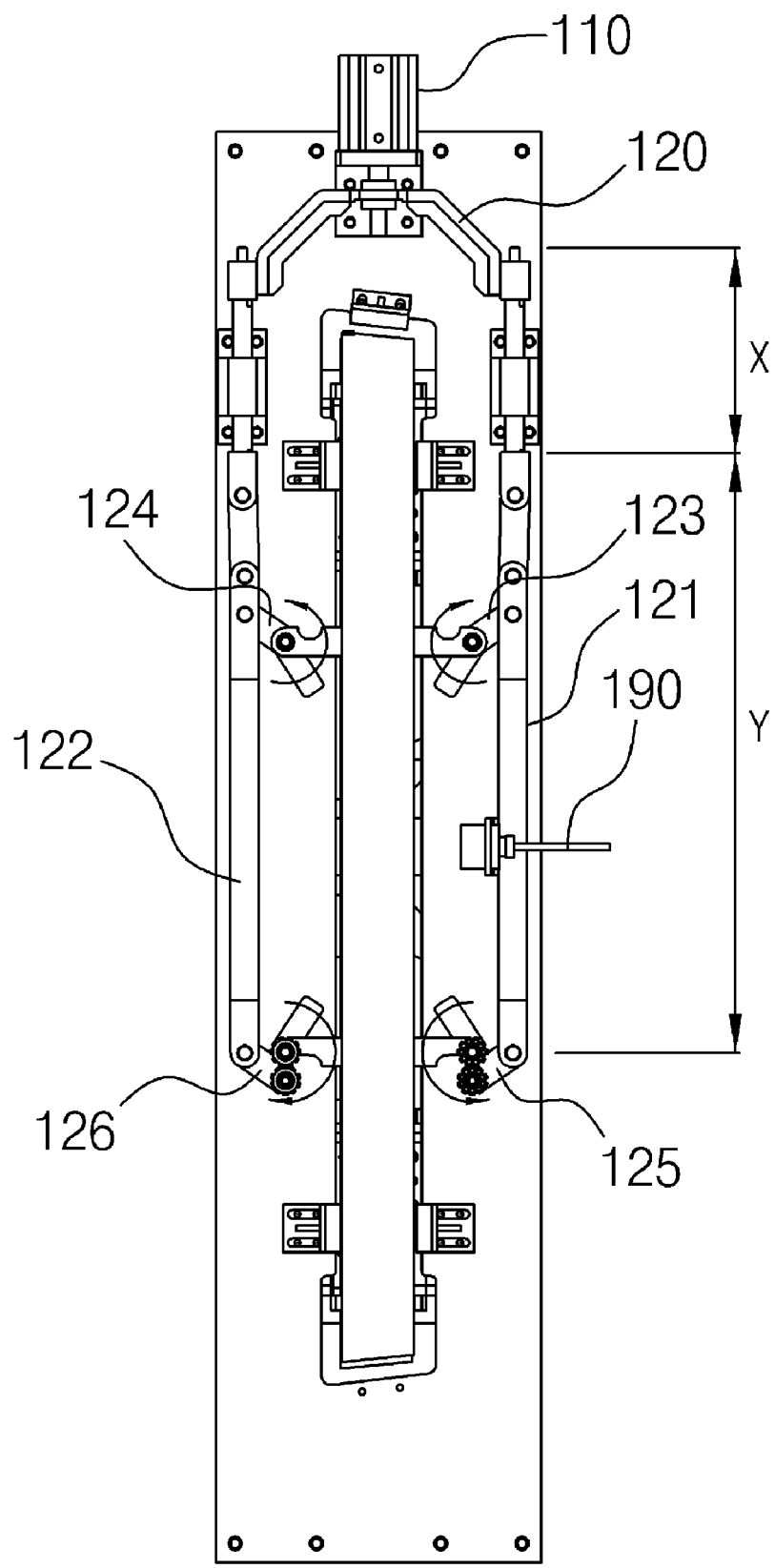
FIG. 4 is a plan cross-sectional view showing a backward state of a pneumatic cylinder of the automatic part dropping unit in accordance with the present invention.
Figure 5:
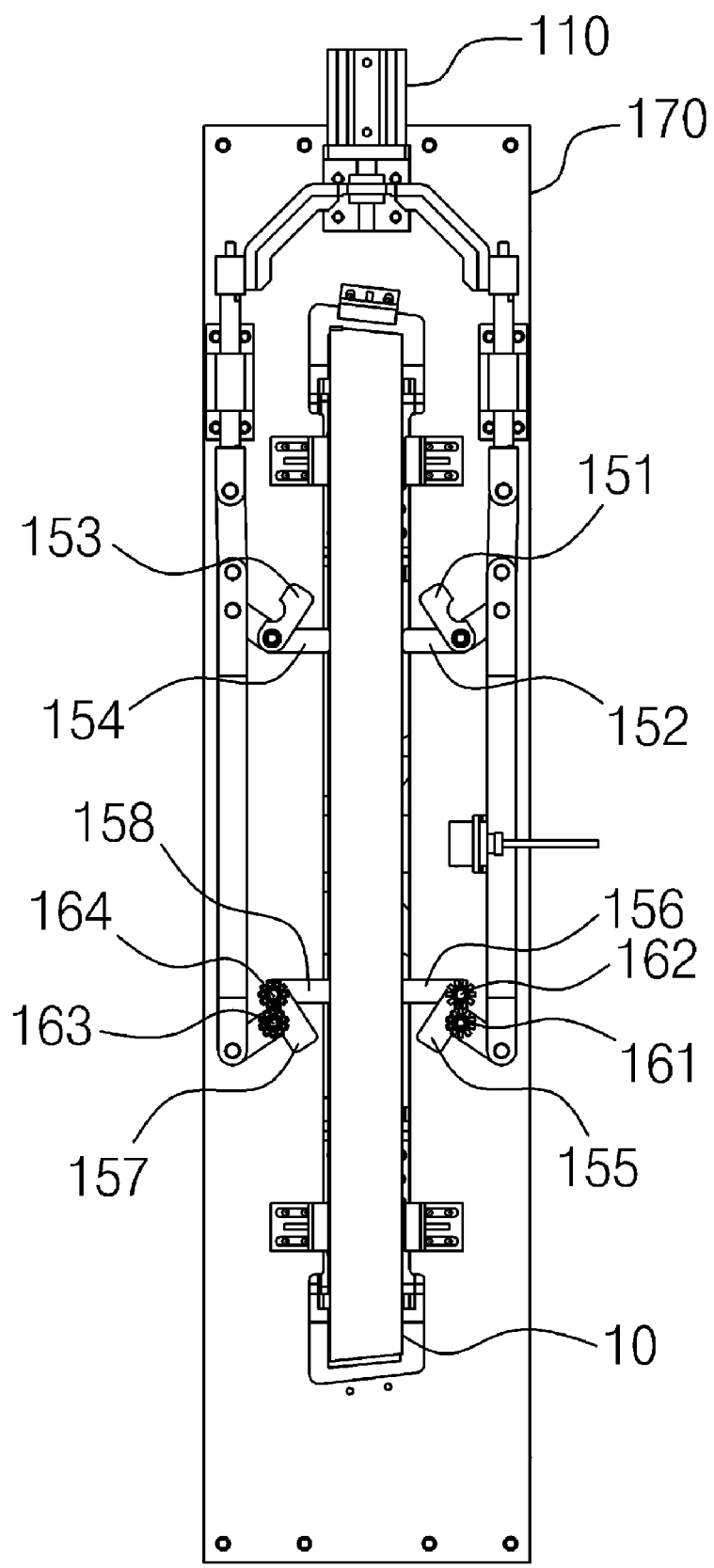
FIG. 5 is a plan cross-sectional view showing a forward state of the pneumatic cylinder of the automatic part dropping unit in accordance with the present invention.

FIG. 3 is a perspective view showing the preferred automatic part dropping unit 100 in accordance with embodiments of the present invention, and FIGS. 4 and 5 are cross-sectional views showing the preferred operation states according to backward and forward movements of the pneumatic cylinder 110 of the automatic part dropping unit 100 in accordance with further preferred embodiments of the present invention.

The apparatus for extracting parts from a general-purpose storage for various vehicle models in accordance with the present invention may comprises at least one automatic part dropping unit 100 as shown in FIG. 1, and a suitable configuration of the automatic part dropping unit 100 that will be preferably described in detail with reference to exemplary FIGS. 3 to 5 below.

Preferably, as shown in FIG. 3, the automatic part dropping unit 100 comprises, in preferred embodiments, the pneumatic cylinder 100 and the plurality of plates suitably rotated by the operation of the pneumatic cylinder 100. The pneumatic cylinder 110 is an actuator that automatically drops the part 10 to be fed to the process, and a suitably equivalent effect can be achieved by a hydraulic cylinder that is preferably capable of linearly reciprocating. in further preferred embodiments, the pneumatic cylinder 110 is fixed to a side surface of the automatic part dropping unit 100 and suitably configured to linearly reciprocate as shown in FIG. 4. Preferably, the pneumatic cylinder 110 is suitably connected to a synchronization bar 120.

In certain preferred embodiments, and as shown in FIG. 4, the synchronization bar 120 preferably includes two joining portions that are suitably provided at the opposite side to the area connected to the automatic part dropping unit 100 and is connected to a pair of driving bars 121 and 122. Preferably, the synchronization bar 120 transfers the driving force of the pneumatic cylinder 110 to the two driving bars 121 and 122 and synchronizes the plates at the left and right sides, suitably rotated by the driving bars, to be operated at the same time.

In further embodiments, the pair of driving bars 121 and 122 preferably includes first transfer levers 123 and 124 and second transfer levers 125 and 126, rotatably connected to each driving bar, respectively, and each transfer lever is suitably connected to a shaft. In further embodiments, and as shown in exemplary FIGS. 3 to 5, each of the pair of driving bars 121 and 122 is preferably configured to be suitably rotated with respect to the horizontal surface by connection means such as a pin. According to certain embodiments, the driving bars may have an area (X) where they can linearly reciprocate at a suitably predetermined interval by the synchronization bar 120 and an area (Y) where the shafts and the driving bars can linearly reciprocate at a suitable predetermined distance in response to the rotation of the transfer levers 123, 124, 125 and 126 rotated with respect to the shafts according to the operation of the pneumatic cylinder 110 with a high degree of freedom.

Preferably, the transfer levers 123, 124, 125 and 126 connected to the driving bars 121 and 122 and rotated are preferably connected to the shafts with keys, and thereby preferably transfers the rotational force received from the pneumatic cylinder 110 to the shafts. In further preferred embodiments of the invention, the shaft is a device that is rotated by the forward and backward movements of the pneumatic cylinder 110 to suitably transmit power to the plurality of plates. Preferably, the shafts may be supported by a frame 140 provided on a base 170 of the automatic part dropping unit 110 and suitably inserted into a bush provided in the frame 140 to be suitably smoothly rotated.

In further embodiments, and in order to prevent the shafts from being pushed by frictional force with the parts being in contact with the shafts according to the rotation of the connected plates, it is preferable that the rotational directions of the connected shafts are opposite to each other to suitably offset the frictional force.

In preferred embodiments of the invention as described herein, for example as shown in FIGS. 3 to 5, plates A 151, 153, 155 and 157 and plates B 152, 154, 156 and 158 are preferably connected to first shafts 131 and 132 rotated with respect to the first transfer levers 123 and 124 such that the plates A and plates B may be rotated by the rotation of the first shafts 131 and 132. Pinions A 161 and 163 and pinions B 162 and 164 are connected to second shafts 133 and 135 and third shafts 134 and 136, respectively, such that the third shafts 134 and 136 may be rotated in a direction opposite to the rotational direction of the second shafts 133 and 135 rotated with respect to the second transfer levers 125 and 126. Preferably, the plates A and the plates B are suitably connected to the third shafts 134 and 136 beside the pinion 162 and 164 in the same manner as the first shafts 131 and 132. It is preferable, in certain cases, that the number of teeth of the pinions A 161 and 163 may be nearly equal or equal to that of the pinions B 162 and 164 so that the rotational movement of the plates by the first shafts and the rotational movement of the plates by the third shafts are made at the same or nearly the same angle.

In further embodiments of the invention as described herein, the plates A 151, 153, 155 and 157 and the plates B 152, 154, 156 and 158 suitably connected to the first shafts 131 and 132 and the third shafts 134 and 136 are preferably arranged alternately at a predetermined angle in the axial direction of the first and third shafts so that the loaded parts preferably form a row in the horizontal direction and are suitably supported by the plates A and the plates B according to the rotational angle of the plates A and the plates B by the rotation of the first and second shafts. In related embodiments, the plates A and the plates B supporting the parts are configured to have sufficient hardness in consideration of the load of the parts.

In further related embodiments, it is preferable that the plates A 151, 153, 155 and 157 and the plates B 152, 154, 156 and 158 have nearly the same or the same shape (preferably including length) so that the rotational trace of the plates A coincides with that of the plates B. As a result, it is possible to suitably facilitate the design of the automatic part dropping unit 100 so as to suitably support the parts.

In further preferred embodiments as described herein, in forming a suitable predetermined angle between the plates A 151, 153, 155 and 157 and the plates B 152, 154, 156 and 158 have, it is possible to form an angle between the plates A and the plates B so that preferably, the support of the parts dropped from the plates A to the plates B or from the plates B to the plates A is smoothly changed, preferably in consideration of the drop time according to a height difference between the loaded parts adjacent to each other and the rotational speed of the plates A and the plates B according to the forward and backward movements of the pneumatic cylinder 110.

Preferably, as shown in FIG. 3, a suitable guide 180 for guiding the drop path of the parts 10 to be placed on the next plate may preferably be provided on the base 170 of the automatic part dropping unit 100 in the case where the loaded parts 10 are freely dropped according to the rotation of the corresponding plate.

In other further embodiments, a proximity sensor 190 for detecting the number of loaded parts of the automatic part dropping unit 100 may be preferably provided on the base 170 of the automatic part dropping unit 100 so that, if, for example, a small number of parts remains, the worker preferably reloads the parts. For example, in certain embodiments, the proximity sensor 190 may be installed in an area where it can suitably detect the third part from the bottom of the loaded parts so that, for example, if less than, for example, two loads remain, it detects the same, stops the extraction of the parts, and sends a suitable warning message to the worker to request the reload.

Not shown in the figures, but encompassed in the description provided herein, it is possible that the second shafts and the pinions of the automatic part dropping unit 100 may be suitably eliminated by calculating the distance in the horizontal direction that the parts can move during dropping according to the rotational speed of the plates A or the plates B in consideration of the drop distance according to the position of the loading jig 210 of the receiving unit 200, and the third shafts may be directly rotated by the second transfer levers 125 and 126.

In other preferred embodiments, the operation of the automatic part dropping unit 100 will be described with respect to FIGS. 4 and 5. FIG. 4 shows the backward state of the pneumatic cylinder 110 of the automatic part dropping unit 100. Preferably, the synchronization bar 120 and the driving bars 121 and 122 are in the backward state in connection with the backward state of the pneumatic cylinder 110. According to certain embodiments, in the backward state of the pneumatic cylinder 110, one of the loaded parts is suitably supported by the four plates A fixedly connected to the first and third shafts and preferably loaded on the automatic part dropping unit 100. Preferably, in further embodiments, since the plates B are configured to be suitably rotated keeping a predetermined angle with the plates A, the plates B do not support the loaded parts in the backward state of the pneumatic cylinder 110, but is in a standby state.

In embodiments of the invention as described herein, when an extraction command for the loaded parts is preferably given by control means in the backward state of the pneumatic cylinder 110, the pneumatic cylinder 110 is suitably operated to move forward, and the rotational direction of the plates A 151, 153, 155 and 157 and the plates B 152, 154, 156 and 158 according to the operation of the pneumatic cylinder 110 is the same as shown in FIG. 4.

FIG. 5 shows an exemplary forward state of the pneumatic cylinder 110 of the automatic part dropping unit 100. Preferably, the synchronization bar 120 and the driving bars 121 and 122 in the backward state are moved forward by the forward movement of the pneumatic cylinder 110, and the first shafts 131 and 132 and the second shafts 133 and 135 connected to the transfer levers are suitably rotated by the transfer levers rotated with respect thereto. According to certain embodiments, with the rotation of the first shafts 131 and 133, each pair of plates A and plates B suitably fixedly connected is rotated in the same direction, keeping a predetermined angle, as shown in FIG. 4. Preferably, in further embodiments, with the rotation of the second shafts 133 and 135, the pinions A 161 and 163 connected to the second shafts 133 and 135 rotate the third shafts including the pinions B 162 and 164 in a direction opposite to the rotational direction of the second shafts 133 and 135, and thereby the plates A and the plates B fixedly connected to the third shafts are suitably rotated in the same direction, keeping a predetermined angle, as shown in FIG. 4.

Accordingly, in preferred embodiments, the plates A and the plates B connected to the first shafts 131 and 132 and the third shafts 134 and 136 are suitably rotated in the opposite direction by the pinions A 161 and 163 and the pinions B 162 and 164. As a result, in further embodiments, the plates A 151, 153, 155 and 157 and the plates B 152, 154, 156 and 158 suitably offset the force generated in the tangential direction of the rotation while being in contact with the parts to prevent the movement in the horizontal direction, and thereby the parts receive only the drop force in the vertical direction by gravity, thus facilitating the control of the dropped parts.

Preferably, the parts supported by the plates A 151, 153, 155 and 157 according to the rotation of the first shafts 131 and 132 and the third shafts 134 and 136 lose the contact with the pates A 151, 153, 155 and 157 according to the rotation of the pates A 151, 153, 155 and 157 and are freely dropped while being be supported by neither plates A nor plates B. In further embodiments, the part located in the lowest position among the loaded parts is preferably placed on the loading jig 210 of the receiving unit 200, and the other parts are suitably caught by the rotating plates B during dropping and completely supported by the plates B, if the forward movement of the pneumatic cylinder 110 is suitably completed, thus, in further embodiments, preferably forming the backward state of the pneumatic cylinder 110 of the automatic part dropping unit 100.

According to further embodiments, and as shown in exemplary FIG. 5, the respective loaded parts are suitably supported by the pairs of plates B in the backward state of the pneumatic cylinder 110 of the automatic part dropping unit 100, and the states as shown in FIGS. 4 and 5 are preferably repeated with the repetition of the forward and backward movements of the pneumatic cylinder 110.

Figure 6:
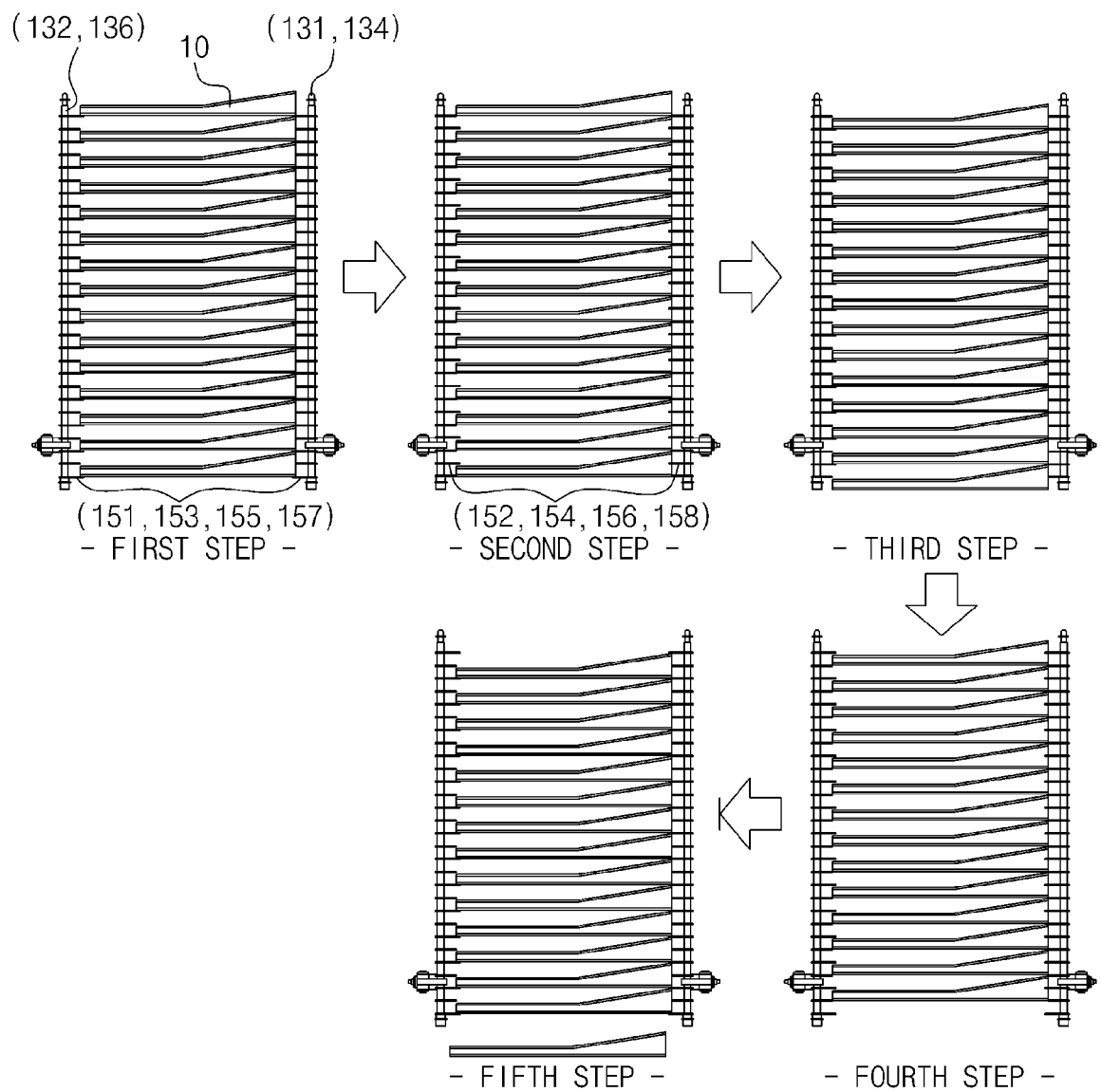
FIG. 6 is side cross-sectional views of the automatic part dropping unit, in which a process of extracting parts according to forward and backward movements of the pneumatic cylinder is shown.

FIG. 6 shows exemplary side cross-sectional views of the automatic part dropping unit 100, in which a process of extracting parts according to the forward and backward movements of the pneumatic cylinder 110 is shown.

In further embodiments, as shown in FIG. 6, a first step preferably corresponds to the backward state of the pneumatic cylinder 110 as shown in FIG. 4, in which the loaded parts are supported by the pairs of plates A and the plates B are preferably in a standby state where they are not suitably in connection with the parts.

According to other further embodiments, in a second step, the plates A 151, 153, 155 and 157 and the plates B 152, 154, 156 and 158 are suitably rotated by the forward movement of the pneumatic 110, and thereby the automatic part dropping unit 100 is preferably converted to the forward state of the pneumatic cylinder 110 as shown in FIG. 5. Preferably, during this, the plates A are suitably drawn out of the positions that support the parts, and the plates B are positioned to support the parts. In preferred embodiments, in the above second step, all loaded parts are to be suitably freely dropped.

According to preferred embodiments, in a third step, while the parts are freely dropped, the part located at the lowest position is dropped from the automatic part dropping unit 100 since the plate B supporting the part is not present, and the other parts are suitably supported by the pairs of plates B located at the bottom thereof, thus maintaining the loaded state.

According to other preferred embodiments, in a fourth step, when the pneumatic cylinder 110 moves backward again, the plates B are drawn out of the positions that support the parts, and the plates A are suitably positioned to support the parts. In the above fourth step, all loaded parts are to be freely dropped in the same manner as the second step.

According to still other preferred embodiments, in a fifth step, while the parts passing through the fourth step are freely dropped, the part located at the lowest position is extracted, the other parts are suitably supported by the pairs of plates A located at the bottom thereof, and the plates B are preferably in the standby state again.

Preferably, the fifth step has the same state as the first step and, in the case where the parts are extracted from the automatic part dropping unit 100, the above-described steps are preferably repeated.

Figure 7:
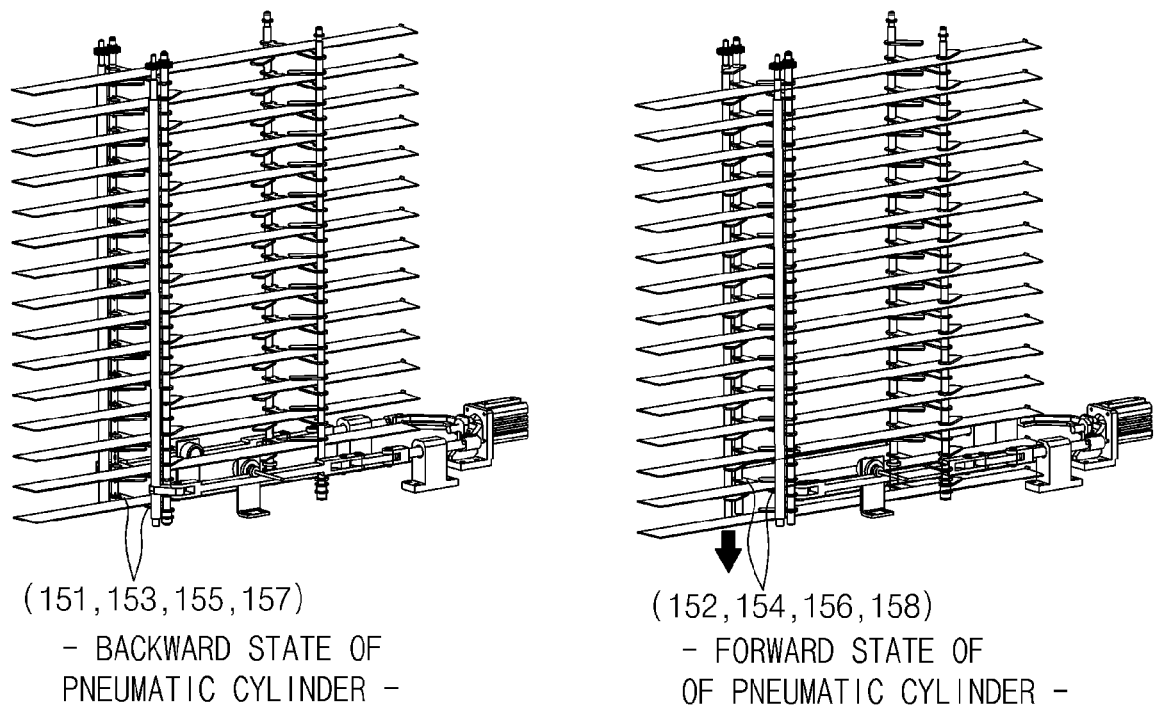
FIG. 7 is perspective views showing the backward and forward states of the pneumatic cylinder of the automatic part dropping unit.

FIG. 7 is perspective views showing the backward and forward states of the pneumatic cylinder 110 of the automatic part dropping unit 100. The left figure of FIG. 7 corresponds to the backward state of the pneumatic cylinder 110 as shown in FIG. 4, in which the respective parts are supported by the plates A 151, 153, 155 and 157.

In certain preferred embodiments, when the pneumatic cylinder 110 moves forward, the parts preferably pass through the first to third steps as shown in FIG. 6, thus suitably forming the forward state of the pneumatic cylinder 110 of the automatic part dropping unit 100. Accordingly, the respective parts are preferably loaded by the plates B the same as the forward state of the pneumatic cylinder 110 of the automatic part dropping unit 100 as shown in the right figure of FIG. 7, and the part located at the lowest position is dropped to the loading jig 210 and then transferred to the next process.

In further embodiments, the pneumatic cylinder 110 moves backward again in the forward state as shown in the right figure of FIG. 7, the parts pass through the forth and fifth steps as shown in FIG. 6 and are returned to the backward state of the pneumatic cylinder 110 as shown in the left figure of FIG. 7.

Figure 8:
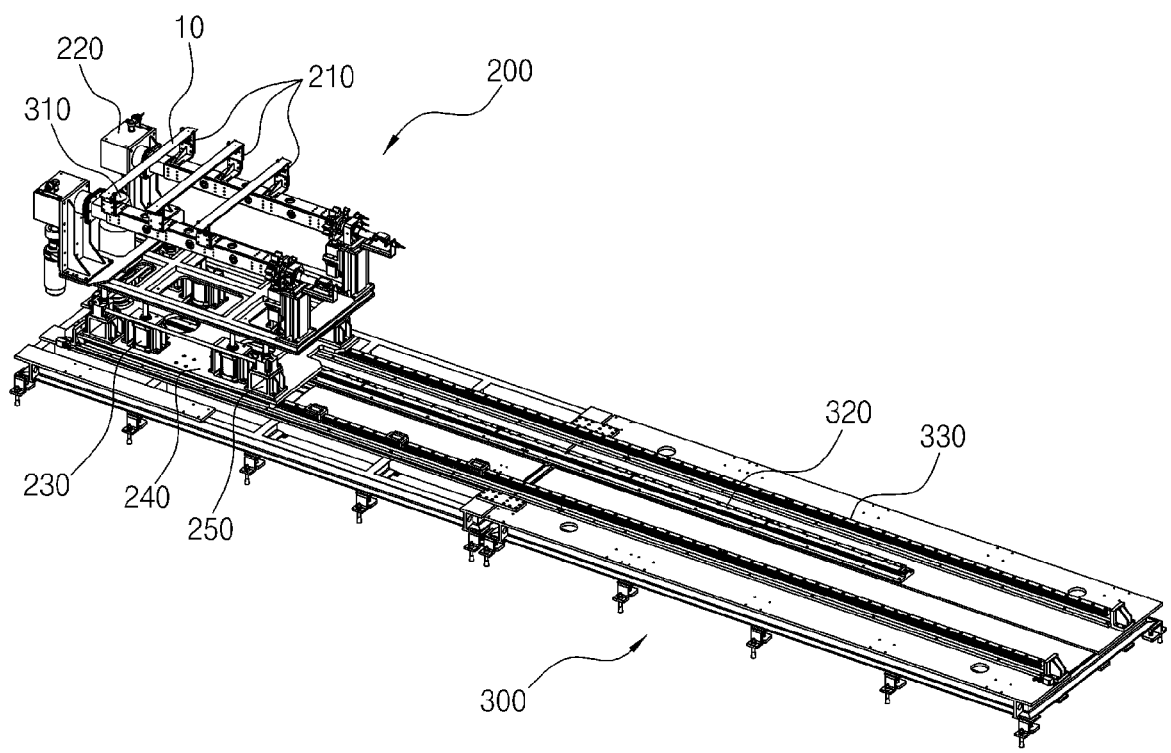
FIG. 8 is a perspective view showing a receiving unit and a transfer unit in accordance with the present invention.

FIG. 8 shows the receiving unit 200 and the transfer unit 300 of the apparatus for extracting parts from a general-purpose storage for various vehicle models in accordance with preferred embodiments of the present invention.

As shown in FIG. 8, the receiving unit 200 comprises an index 220, the loading jigs 210, an air cylinder 230, a power base 240, and an LM bush 250.

Preferably, the receiving unit 200 is a device for receiving the parts dropped from the automatic part dropping unit 100 and suitably includes the loading jig 210 for receiving the dropped part. According to preferred embodiments, the loading jig 210 of the receiving unit 200 is rotatably provided, and the receiving unit 200 preferably includes a plurality of loading jigs 210 corresponding to the parts for various vehicle models so as to select a loading jig suitably corresponding to the part to be extracted. Preferably, the index 220 is a device that suitably positions the loading jig corresponding to the part for a desired vehicle model on the drop position. Preferably, the receiving unit 200 includes load jigs for four vehicle models arranged at an interval of 90° so that the index 220 rotates the loading jigs by 90° to select the loading jig corresponding to the desired vehicle model.

According to certain embodiments of the invention, the air cylinder 230 is an actuator that lifts the loading jigs 210 and is operated together with the power base 240 and the LM bush 250, which synchronize the up and down movement of the loading jigs according to the operation of the air cylinder 230. The air cylinder 230, the power base 240, and the LM bush 250 are suitably configured to facilitate the reception of the dropped part by lifting the load jig when the part is extracted from the automatic part dropping unit 100 and to drop the loading jig that receives the part so that the part is fed to the process.

As shown in FIG. 8, in certain embodiments of the invention, the transfer unit 300 preferably comprises a servo motor 310 as a driving source, a rack 320, a pinion (not shown), and an LM guide 330 as a suitable transfer means.

In certain embodiments, the servo motor 310 provides power for suitably transferring the receiving unit 100 including the loading jigs 210, and the receiving unit 100 is transferred to a desired position through the rack 320 provided in the receiving unit 200 and the pinion provided on the transfer path. Preferably, the LM guide 330 may be suitably provided on the transfer path so that the receiving unit 200 may linearly reciprocate while keeping the transfer path during the transfer.

In further preferred embodiments, the apparatus for extracting parts from a general-purpose storage for various vehicle models may preferably include control means which suitably selects a desired vehicle model, positions the loading jig 210 of the receiving unit 200 on the automatic part dropping unit 100 on which the parts corresponding to the desired vehicle model are suitably loaded, and extracts the desired parts by preferably operating the pneumatic cylinder 110 of the corresponding automatic part dropping unit 100.

Preferably, in certain embodiments of the invention, when the part dropped from the automatic part dropping unit 100 is suitably received on the loading jig 210 of the receiving unit 200 and the loading jig 210 is moved down, the part to be extracted is preferably transferred to a desired position through the rack 320, the pinion (not shown), and the LM guide 330 by the power of the servo motor 310, and then the part is fed to the process by a robot. in further embodiments, after the part is extracted, the receiving unit 200 is returned in the opposite direction of the transfer path to extract another part through the control means.

Preferably, with the embodiments of the above-described configuration, it is possible to realize the apparatus for extracting parts from a general-purpose storage for various vehicle models, in which a desired part among the parts corresponding to various vehicle models is suitably extracted and fed to the process.

According to the invention as described herein, the forward and backward movements of the pneumatic cylinder is suitably controlled without a worker, the rotational movement of the plurality of plates can be controlled, and thereby it is possible to suitably feed the parts one by one to the process, thus realizing an unmanned automatic feeding apparatus. Accordingly, as described in the preferred embodiments herein, it is possible to reduce manufacturing cost and eliminate unnecessary processes, thus improving productivity.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for releasing parts from a general-purpose storage for various vehicle models, the apparatus comprising:
    at least one automatic part dropping unit including a pneumatic cylinder;
    a receiving unit including a plurality of loading jigs; and
    a transfer unit for feeding the receiving unit to a process,
    wherein the automatic part dropping unit includes a plurality of plates A and plates B horizontally arranged in groups, each group to support a part which are loaded vertically and a plurality of shafts rotated by the operation of the pneumatic cylinder such that the plurality of plates A and plates B connected alternately to the shafts at a predetermined angle are reciprocated and rotated by the operation of the pneumatic cylinder to release each part to a sequentially lower position among the loaded parts therein sequentially feeding parts one by one to the receiving unit.

2. The apparatus of claim 1, wherein the automatic part dropping unit comprises: a base on which the pneumatic cylinder is provided; a synchronization bar having two ends moved in connection with forward and backward movements of the pneumatic cylinder; a pair of driving bars connected to the two ends of the synchronization bar and rotated together therewith; a pair of first transfer levers and a pair of second transfer levers, rotatably connected to the pair of driving bars, respectively; a pair of first shafts rotatably connected by the pair of first transfer levers; a pair of second shafts rotatably connected by the pair of second transfer levers; and a frame for assisting the rotation of the first and second shafts and fixed to the base,
    wherein the first shafts and the second shafts include a plurality of plates A and plates B alternately connected thereto at a predetermined angle, and the part at the lowest position loaded on the automatic part dropping unit is extracted when the plates connected to the first shafts and the second shafts are rotated by the forward and backward movements of the pneumatic cylinder.

3. The apparatus of claim 1, wherein the automatic part dropping unit comprises: a base on which the pneumatic cylinder is provided; a synchronization bar having two ends moved in connection with forward and backward movements of the pneumatic cylinder; a pair of driving bars connected to the two ends of the synchronization bar and rotated together therewith; a pair of first transfer levers and a pair of second transfer levers, rotatably connected to the pair of driving bars, respectively; a pair of first shafts rotatably connected by the pair of first transfer levers; a pair of second shafts rotated by the pair of second transfer levers and connected to a pair of pinions A; a pair of third shafts connected to a pair of pinions B moved in connection with the pair of pinions A and rotated together therewith; and a frame for assisting the rotation of the first to third shafts and fixed to the base,
    wherein the first shafts and the third shafts include a plurality of plates A and plates B alternately connected thereto at a predetermined angle, and the part at the lowest position loaded on the automatic part dropping unit is extracted when the plates connected to the first shafts and the third shafts are rotated by the forward and backward movements of the pneumatic cylinder.

4. The apparatus of claim 3, wherein the automatic part dropping unit comprises at least one guide provided on the base in the vertical direction to assist the drop of the loaded parts.

5. The apparatus of claim 3, wherein the automatic part dropping unit comprises a detection sensor for detecting the number of loaded parts.

6. The apparatus of claim 1, wherein the receiving unit including the plurality of loading jigs comprises an air cylinder, a power base, and an LM bush such that the receiving unit is moved up and down.

7. The apparatus of claim 6, wherein the plurality of loading jigs of the receiving unit is configured to be rotated to correspond to various vehicle models, and the receiving unit comprises an index for controlling the rotation of the plurality of loading jigs.

8. The apparatus of claim 1, wherein the transfer unit comprises a servo motor, a rack, a pinion, and an LM guide.

9. An apparatus for releasing parts from a general-purpose storage for various vehicle models, the apparatus comprising:
    at least one automatic part dropping unit;
    a receiving unit; and
    a transfer unit for feeding the receiving unit to a process,
    wherein the automatic part dropping unit includes a plurality of plates A and plates B horizontally arranged in groups, each group to support a part which are loaded vertically and a plurality of shafts rotated by the operation of a pneumatic cylinder such that the plurality of plates A and plates B connected alternately to the shafts are reciprocated and rotated by the operation of the pneumatic cylinder to release each part to a sequentially lower position among the loaded parts therein sequentially feeding parts one by one to the receiving unit.

10. The apparatus of claim 9, wherein the automatic part dropping unit includes a pneumatic cylinder.

11. The apparatus of claim 9, wherein the receiving unit includes a plurality of loading jigs.

12. The apparatus of claim 9, wherein the plurality of plates A and plates B connected alternately to the shafts are connected at a predetermined angle.

13. The apparatus of claim 9, wherein the automatic part dropping unit comprises: a base on which a pneumatic cylinder is provided; a synchronization bar having two ends moved in connection with forward and backward movements of the pneumatic cylinder; a pair of driving bars connected to the two ends of the synchronization bar and rotated together therewith; a pair of first transfer levers and a pair of second transfer levers, rotatably connected to the pair of driving bars, respectively; a pair of first shafts rotatably connected by the pair of first transfer levers; a pair of second shafts rotatably connected by the pair of second transfer levers; and a frame for assisting the rotation of the first and second shafts and fixed to the base.

14. The apparatus of claim 13, wherein the first shafts and the second shafts include a plurality of plates A and plates B alternately connected thereto at a predetermined angle, and the part at the lowest position loaded on the automatic part dropping unit is released when the plates connected to the first shafts and the second shafts are rotated by the forward and backward movements of the pneumatic cylinder.

* * * * *